(12) United States Patent
Pachner et al.

(10) Patent No.: US 8,244,384 B2
(45) Date of Patent: Aug. 14, 2012

(54) SYSTEM IDENTIFICATION IN AUTOMATED PROCESS CONTROL

(75) Inventors: Daniel Pachner, Prague (CZ); Pavel Trnka, Prague (CZ)

(73) Assignee: Honeywell International Inc., Morristown, NJ (US)

( * ) Notice: Subject to any disclaimer, the term of this patent is extended or adjusted under 35 U.S.C. 154(b) by 327 days.

(21) Appl. No.: 12/590,652

(22) Filed: Nov. 12, 2009

(65) Prior Publication Data

US 2011/0112659 A1 May 12, 2011

(51) Int. Cl.
- *G05B 13/02* (2006.01)
- *G01R 35/00* (2006.01)
- *G06F 7/60* (2006.01)
- *G06F 17/10* (2006.01)

(52) U.S. Cl. ............ 700/30; 700/28; 700/29; 700/31; 700/38; 700/45; 702/109; 702/120; 703/2

(58) Field of Classification Search .............. 700/28–31, 700/37–39, 44–46; 318/561, 609; 703/1–2; 702/109, 116, 120, 126

See application file for complete search history.

(56) References Cited

U.S. PATENT DOCUMENTS

| | | | | |
|---|---|---|---|---|
| 5,232,736 A * | 8/1993 | Tribbey et al. | ............. | 427/8 |
| 5,309,837 A * | 5/1994 | Nanzai | ............. | 101/425 |
| 5,553,538 A * | 9/1996 | Freitag | ............. | 101/123 |
| 5,709,905 A * | 1/1998 | Shaw et al. | ............. | 427/8 |
| 5,751,910 A * | 5/1998 | Bryant et al. | ............. | 706/2 |
| 5,791,243 A * | 8/1998 | Marcoux et al. | ............. | 101/123 |
| 5,880,017 A * | 3/1999 | Schwiebert et al. | ............. | 438/613 |
| 7,171,897 B2 * | 2/2007 | Barajas et al. | ............. | 101/129 |
| 2008/0071395 A1 * | 3/2008 | Pachner | ............. | 700/34 |
| 2010/0204808 A1 * | 8/2010 | Thiele | ............. | 700/30 |
| 2010/0271989 A1 * | 10/2010 | Chernoguzov et al. | ............. | 370/310 |
| 2011/0098548 A1 * | 4/2011 | Budiman et al. | ............. | 600/365 |
| 2011/0106011 A1 * | 5/2011 | Cinar et al. | ............. | 604/151 |

OTHER PUBLICATIONS

LQG Control of a CFD-based Aeroelastic Wing Model, Choi el al., Procedings of the 42nd IEEE, Dec. 2003, pp. 4939-4944.*
Modeling, Identification, Design, and Implementation of Nonlinear Automative Idle Speed Control Systems—An Overview, Zhengmao Ye, vol. 37, No. 6, Nov. 2007, pp. 1137-1151.*
"Decentralized and Wireless Control of Large-scale Systems—WIDE", *Small or medium-scale focused research project (STREP) proposal—FP7-ICT Call 2*, FP7-ICT-2007-2-STREP proposal — WIDE, (Aug. 10, 2007), 1-69.

* cited by examiner

*Primary Examiner* — Ramesh Patel
(74) *Attorney, Agent, or Firm* — Schwegman, Lundberg & Woessner P.A.

(57) ABSTRACT

The systems and methods described herein allow for automatic identification experiments in a closed loop, where the old control strategy, already tuned and tested, is utilized. The strategy is modified to inject additional signal optimized for identification. The experimenting time may be reduced by performing only those system manipulations which explore model uncertainties important to potential degradation of controller performance by discrepancy between the system and the model. The disruptions are reduced by keeping the control loop closed, which eliminates waiting for steady state before applying steps to the inputs and reduces the risk of process limits crossing. The energy of additional signal can be set to meet the maximum allowable disruption requirements. The energy of additional signal is in a direct relation to the speed of identification related information gathering. It can be varied in time to follow the needs of system operators.

20 Claims, 10 Drawing Sheets
(9 of 10 Drawing Sheet(s) Filed in Color)

# US 8,244,384 B2

SYSTEM IDENTIFICATION IN AUTOMATED PROCESS CONTROL

TECHNICAL FIELD

The present invention relates generally to the field of control systems and methods. More specifically, the present invention pertains to system model identification used for Automated Process Control (APC) and Model Predictive Control (MPC) controllers.

BACKGROUND

In control theory Advanced Process Control (APC) is a broad term composed of different kinds of process control tools, often used for solving multivariable control problems or discrete control problem. APC is composed of different kinds of process control tools, for example Model Predictive Control (MPC), Statistical Process Control (SPC), Run2Run (R2R), Fault Detection and Classification (FDC), Sensor control and Feedback systems. APC applications are often used for solving multivariable control or discrete control problems. In some instances an APC system is connected to a Distributed Control System (DCS). The APC application will calculate moves that are sent to regulatory controllers. Historically the interfaces between DCS and APC systems were dedicated software interfaces. Alternatively, the communication protocol between these systems is managed via the industry standard Object Linking and Embedding (OLE) for Process Control (OPC) protocol.

APC can be found in the (petro) chemical industries where it makes it possible to control multivariable control problems. Since these controllers contain the dynamic relationships between variables it can predict in the future how variables will behave. Based on these predictions, actions can be taken now to maintain variables within their limits. APC is used when the models can be estimated and do not vary too much. In the complex semiconductor industry where several hundred steps with multiple re-entrant possibilities occur, APC plays an important role for control the overall production. In addition, APC is more and more used in other industries. In the mining industry for example, successful applications of APC (often combined with Fuzzy Logic) have been successfully implemented. APC implementation is in more than 95% of cases done as a replacement of an old control such as a proportional-integral-derivative (HD) controllers.

APC performance, for example the performance of a MPC system, is significantly dependent on the quality of the target system model. Therefore, a very important part of APC design is system model identification by performing experiments on the system. It is well-known fact that these experiments represent the highest costs of APC implementation. The reason is that the experiments are traditionally done by step testing, requiring long duration, where normal system operation and production processes are significantly disrupted.

Step testing is typically performed by opening the control loop (leaving the process control on the manual control of an operator), waiting for the system to reach a steady state, making a step change in selected input and observing the behavior for eventual manual intervention preventing process limits crossing. This is repeated for individual inputs. The long duration of this type of testing is caused by the need to wait for steady state before step changes can be applied. The disruptions are caused by opening the control loop and applying step changes to the inputs.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

SUMMARY

Figure 1:
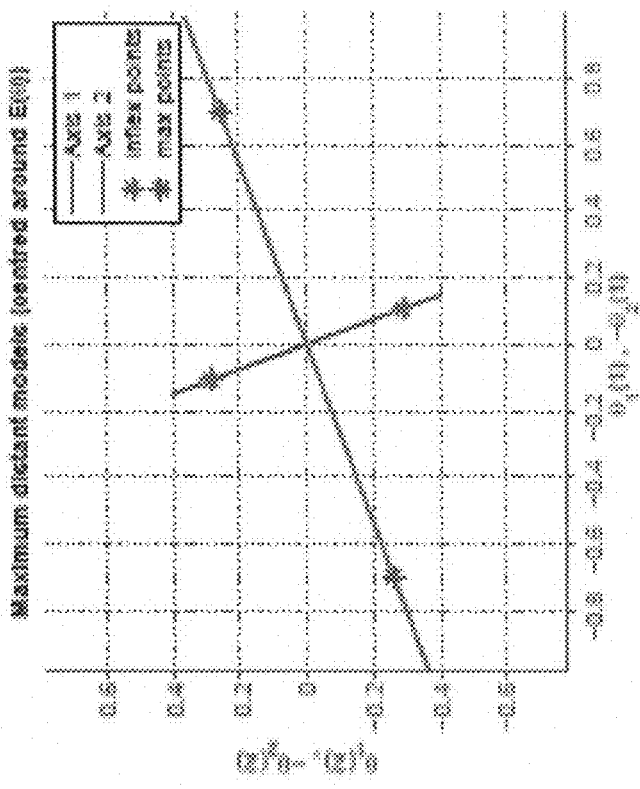
FIG. 1($a$) and FIG. 1($b$) illustrate maximum distant model selection for a model with two parameters.
Figure 1:
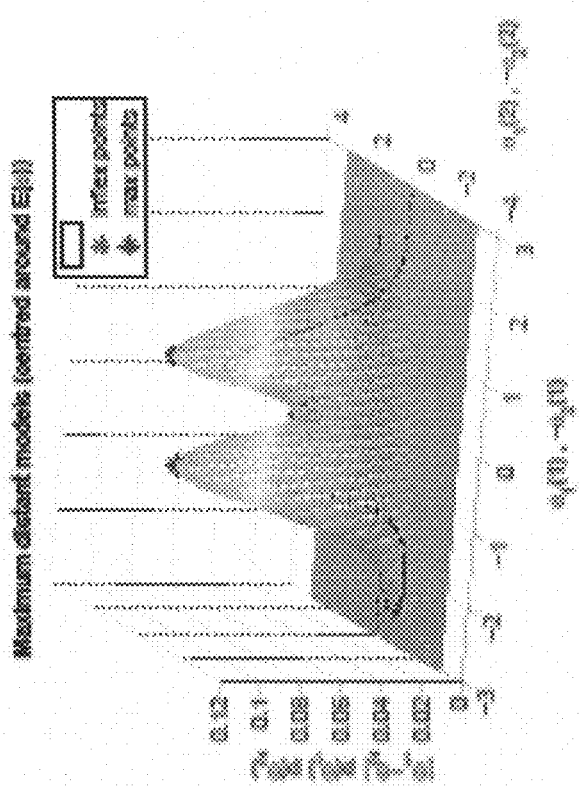

A method and apparatus for system model identification by performing closed-loop identification experiments on the system to be controlled. The input includes a system control component and an identification component that are determined simultaneously.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

The systems and methods described herein allow for automatic identification experiments in a closed loop, where the old control strategy, already tuned and tested, is utilized. The strategy is modified to inject additional signal optimized for identification. As described in more detail below, the experimenting time is reduced by performing only those system manipulations which explore model uncertainties important to potential degradation of controller performance by discrepancy between the system and the model. The disruptions are reduced by keeping the control loop closed, which eliminates waiting for steady state before applying steps to the inputs and reduces the risk of process limits crossing.

According to one example embodiment, the system has a single "control knob" parameter adjusting the energy of additional signal used to explore the system. This knob allows conducting identification experiment, where open-loop operation is not possible due to the limits on maximum disruption. The energy of additional signal can be set to meet the maximum allowable disruption requirements. The energy of additional signal is in a direct relation to the speed of identification related information gathering. It can be varied in time to follow the needs of system operators.

The optimal identification experiment design is a difficult non-convex optimization problem. According to one example embodiment, several simplifications are applied to get a practical system, and the system is based on a well-known Linear Quadratic (LQ) control, which is relaxed to allow limited deviation from LQ optimal trajectory. This deviation is used to inject additional signal optimized for identification.

The system and method described herein are useful to improve the system identification phase in the course of upgrading standard process control (such as implemented with PID controllers) to APC. The standard controller running in a specialized hardware or in an industrial computer is replaced by a controller imitating the previous control strategy in combination with the injection of additional signal optimized for efficient gathering of information for system identification. The additional signal energy control knob is used to adjust the speed of information gathering and related system disruption. Alternatively, the present technology can be used in already running controllers for on-demand process re-identification. It can be also used to design a "stand-alone" identification experiment (i.e. replace step testing), where some rough system model has to be known a priori or it can be obtained from short step testing or system knowledge.

As noted above, optimal input design for identification is a non-convex problem, which can be made tractable by simplification. According to one embodiment of the present technology, the simplification applied provides that in each sampling period two models are selected from parameters uncertainty (probability density function or "p.d.f."), such that discriminating between these two models would bring the largest improvement in the model quality (improvement in parameters variance or control oriented model quality criterion). The input trajectory is then designed to cause the largest difference on the outputs of selected models, which would allow the identification process to efficiently distinguish between them.

The input design is based on a relaxed linear quadratic (LQ) controller (referred to herein as "LQID"), which allows limited deviation from LQ optimal input trajectory. This degree of freedom is used for perturbation causing the largest output difference between two models selected from the uncertainty. In addition to standard LQ weight parameters there is a single additional parameter k for continuous adjustment of the amount of additional energy used for the identification—setting this parameter to zero forces LQID to behave like a LQ controller. LQID starts with preliminary model p.d.f., which is updated with each new I/O data pair and used for input design.

LQID leads to quadratic programming with quadratic constraints (QPQC), where the minimized quadratic function has negative definite Hessian. This obviously non-convex optimization is shown to be easily solvable for general Hessian by polynomial root finding on the range, where the polynomial is guarantied to be monotonic and to have a single root.

Optimal input design can be formulated in multiple different ways. In one approach the input is designed to maximally reduce a selected metrics on the model p.d.f. In a first implementation the metrics are Euclidean so the input is designed to minimize the largest eigenvalue of parameters covariance in each step. Another selection would be for example to minimize control performance criterion variance with respect to model parameters uncertainty.

Another deviation from optimality is that the experiment is not completely planned ahead to get the largest decrease of selected metrics, which would be possible only for a priori known model. According to one embodiment, the approach is greedy and it designs the input for maximum decrease of the currently largest uncertainty.

Determining Maximum Distant Models

According to one embodiment of the process and system disclosed herein, two "most distant, but still probable" models $\theta_1$ and $\theta_2$ are selected by maximizing their distance times their probability $$\max_{\theta_1,\theta_2} \rho(\theta_1, \theta_2) p(\theta_1) p(\theta_2). \tag{1}$$

The distance metrics $\rho$ can be selected from the control point of view, where for example the difference between models on high frequencies is measured less than on low frequencies. In the first approach the distance is selected in the simplest form as Euclidean $$\rho(\theta_1,\theta_2) = \|\theta_1-\theta_2\|_2.$$

Assuming parameters probability $$\theta \sim N(\hat{\theta},P),$$

then an example of maximized function (1) for model with two parameters is in FIG. 1. This non-convex optimization can be solved by eigenvalues and eigenvectors of P as $$\theta^*_{1,2} = \hat{\theta} \pm \sqrt{\frac{\lambda}{2}} v,$$

where $\lambda$ is the largest eigenvalue and $v$ is the corresponding eigenvector of P.

Determining Maximum/Minimum Difference Input Signal

The two models selected in the previous section are insufficiently discriminated by the current p.d.f. To discriminate between these models there can be found an input signal causing maximum difference between model outputs $$d(y_1,y_2) = D_{KL}(p(y|\theta_1,u)\|p(y|\theta_2,u)),$$

where $D_{KL}$ is Kullback-Leibler divergence. This general formulation is simplified for the first approach by using the point model selection 1Ji,2 and quadratic output distance $$d(y_1, y_2) = \|y_1 - y_2\|_2.$$

Maximizing this distance without restrictions would lead to unlimited input u. Inversion problem can be solved instead: find the input signal causing the smallest difference between the models outputs and find basis, where orthogonal components with unit size are sorted by the norm of additional output difference they cause when added to the input. The output difference for given input u is $$y_1 - y_2 = (H_1 - H_2)u + \Gamma_1 x_1 - \Gamma_2 x_2, \quad (2)$$

where $H_\bullet$ is Toeplitz matrix of impulse response and $\Gamma_\bullet$ is extended observability matrix $$H_\bullet = \begin{pmatrix} h_0 & & & \\ h_1 & h_0 & & \\ \vdots & & \ddots & \\ h_{N-1} & \ldots & \ldots & h_0 \end{pmatrix},$$

$$\Gamma_\bullet = \begin{pmatrix} C \\ CA \\ \vdots \\ CA^{N-1} \end{pmatrix}$$

Introducing regularization to reduce solution sensitivity and substitutions $Z = H_1 - H_2$, $b = \Gamma_1 x_1 - \Gamma_2 x_2$, the minimum difference input signal $u_p$ can be obtained as $$u_p = \arg\min_u \|Zu - b\|_2 + \gamma \|u\|_2,$$

where $\gamma$ is regularization constant. The solution is the same with regularized least squares $$u_p = (Z^T Z + \gamma I)^{-1} Z^T b.$$

The sorted basis can be obtained by singular value decomposition of Z $$Z = U\Sigma V^T.$$

The columns of V contains the basis and corresponding diagonal elements in $\Sigma$ indicate the quadratic norm of additional output difference.

EXAMPLE 1

An example for two second order systems with the same resonance frequency and different attenuations:

$$G(s) = \frac{\omega^2}{s^2 + 2\omega\xi s + \omega} \quad \begin{array}{l} \text{sys1: } \omega_1 = 10\pi, \ \xi_1 = 0.5 \\ \text{sys2: } \omega_2 = 10\pi, \ \xi_2 = 0.05 \end{array} \quad T_s = 0.01s$$

Figure 2:
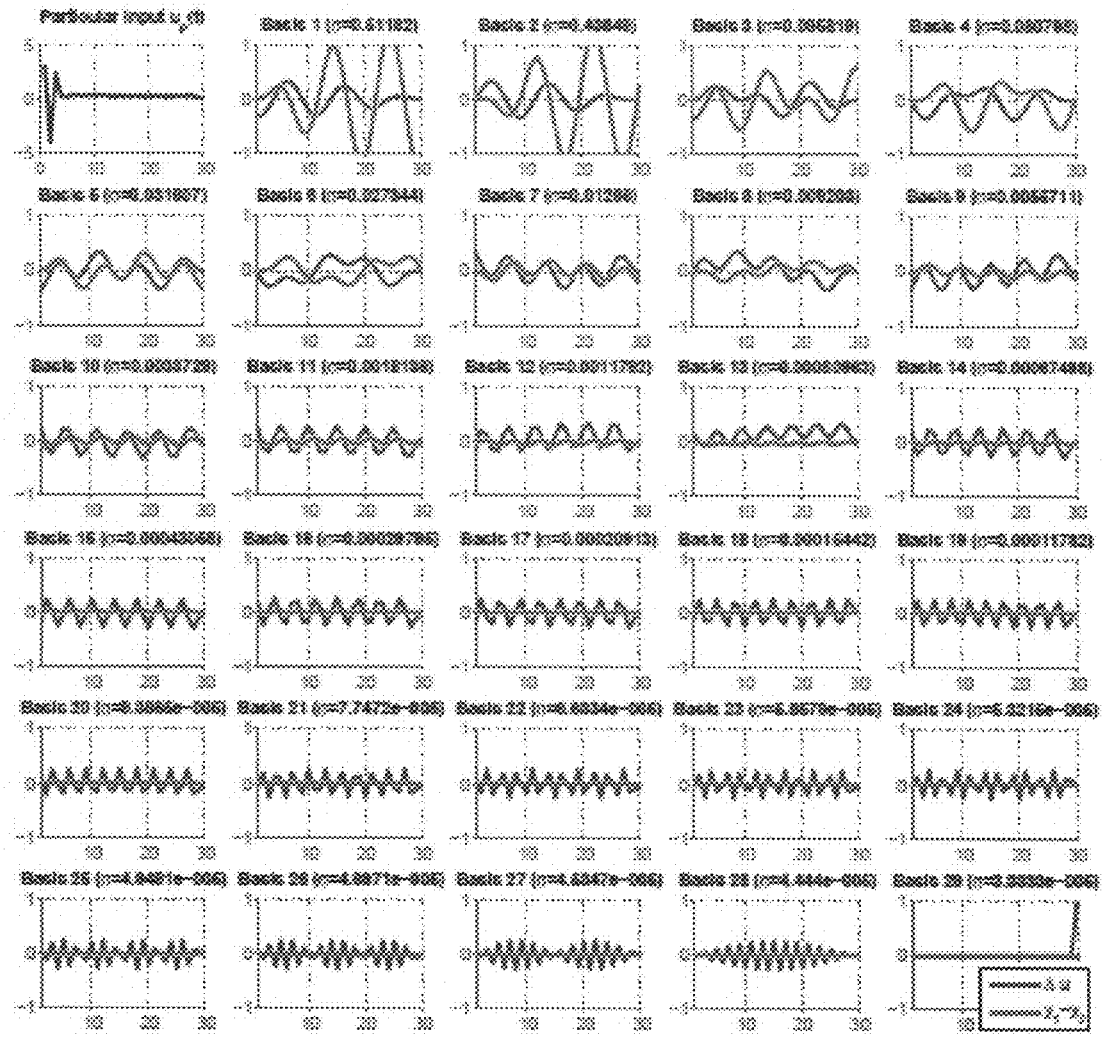
FIG. 2 is a group of graphs showing maximum difference input signal up and individual basis components sorted from the largest to the smallest differences.

Assuming non-zero initial states $x_1$, $x_2$ then the input causing minimal output difference and sorted normalized basis of additional perturbation are in FIG. 2. Notice that largest difference input is harmonic signal on the resonance frequency with decreasing amplitude to cause largest impact on finite horizon with limited energy.

Input signal optimality criterion for two models differentiation can constructed from $u_p$, V and $\Sigma$ as $$\min_u (u - u_p)^T V(-\Sigma) V^T (u - u_p) \quad (3)$$

This is unconstrained negative definite QP minimization problem with unlimited optimal solution. Reasonable constraints based on LQ control relaxation will be shown in the following section.

Relaxed LQ Control

As indicated above, the standard LQ controller is modified to allow additive identification optimal perturbation of input trajectory u along LQ optimal control. Assume LQ control criterion $$J(u) = \sum_{\tau=t}^{\infty} x_\tau^T Q x_\tau + x_\tau^T S u_\tau + u_\tau^T R u_\tau$$

with parameters Q, S, R. Price for the optimal control from state $x_t$ is given by Bellman function $$V_t = x_t^T P x_t$$

where P is the solution of algebraic Riccati equation. According to the optimality principle the LQ optimal input trajectory $\bar{u}$ satisfies $$J(\bar{u}_t^{t+h-1}) + V_{t+h} = V_t.$$

where h is the length of horizon. This equivalence constraint can be relaxed to allow certain degree of freedom for identification optimal perturbation $$J(u_t^{t+h-1}) + V_{t+h} \leq V_t + k, \ k \in (0, \infty), \quad (4)$$

where k is optimality margin.

Proof of Relaxed LQ Stability

LQ control guarantees that Bellman function is reduced in every step for controllable autonomous system, which also assures asymptotic stability. Relaxed LQ defined by (4) does not guarantee Bellman function reduction in every step. However, it can be shown, that it guaranties Lyapunov (non-asymptotic) stability. This is exactly what is needed for identification because the guarantied reduction of Bellman function in every step would mean that system with zero Bellman function (x=0) cannot be excited for identification.

Relaxed LQ implies that h-steps non-optimal control from $x_t$ has to be cheaper than price for optimal control $x_t^T P x_t$ plus margin k. Reducing non-optimal control horizon to single step would not be more expensive than non-optimal control on h steps $$J(u_t^t) + V_{t+1} \leq J(u_t^{t+h-1}) + V_{t+h} \leq V_t + k.$$

This implies that Bellman function would be reduced when $$J(u_t^t) > k,$$

$$x_t^T Q x_t + x_t^T S u_t + u_t^T R u_t > k.$$

This leads to sufficient condition (neglecting lid, that for every k there exists elliptic set around origin $$x_t^T Q x_t \leq k,$$

where outside of this set Bellman function is reduced in each step. This guaranties Lyapunov stability of relaxed LQ control.

Example Implementation

In one embodiment, relaxed LQ control can be realized as quadratic optimization constraint. Denoting $$U = \begin{pmatrix} u_t \\ \vdots \\ u_{t+h-1} \end{pmatrix}, \quad X = \begin{pmatrix} x_t \\ \vdots \\ x_{t+h-1} \\ x_{t+h} \end{pmatrix}, \quad \overline{Q} = \begin{pmatrix} Q & & & \\ & \ddots & & \\ & & Q & \\ & & & P \end{pmatrix},$$

$$\overline{R} = \begin{pmatrix} R & & \\ & \ddots & \\ & & R \end{pmatrix}, \quad \overline{S} = \begin{pmatrix} S & & \\ & \ddots & \\ & & S \\ 0 & \cdots & 0 \end{pmatrix},$$

and expressing states on optimization horizon as $$X = \begin{pmatrix} I \\ A \\ \vdots \\ A^h \end{pmatrix} x_t + \begin{pmatrix} 0 & & & \\ B & 0 & & \\ AB & B & \ddots & \\ \vdots & & \ddots & 0 \\ A^{h-1}B & \cdots & \cdots & B \end{pmatrix} U = Mx_t + NU,$$

the equation (4) can be written as $$X^T \overline{Q} X + X^T \overline{S} U + U^T \overline{R} U \leq x_t^T P x_t + k,$$

leading to quadratic constraint $$U^T H_2 U + f_2^T U + c_2 \leq 0, \text{ where } \begin{aligned} H_2 &= N^T \overline{Q} N + N^T \overline{S} + \overline{R}, \\ f_2^T &= 2x_t^T M^T \overline{Q} N + x_t^T M^T \overline{S}, \\ c_2 &= x_t^T M^T \overline{Q} M x_t - x_t^T P x_t - k. \end{aligned}$$

Reference Tracking and Weighting

Practical realization of relaxed LQ control with reference tracking and input differences weighting with criterion $$J(u) = \sum_{\tau=t}^{\infty} (y_\tau - w_\tau)^T Q_r (y_\tau - w_\tau) + \Delta u_\tau^T R_{\Delta u} \Delta u_\tau$$

is done, in one example embodiment, by standard extension of model and state with reference $w_t$ and input from previous time step $u_{t-1}$ $$\overline{x}_t = \begin{pmatrix} x_t \\ w_t \\ u_{t-1} \end{pmatrix}, \quad \overline{A} = \begin{pmatrix} A & & \\ & 1 & \\ & & 0 \end{pmatrix}, \quad \overline{B} = \begin{pmatrix} N \\ 0 \\ 1 \end{pmatrix}$$

$$Q = \begin{pmatrix} C^T Q_R C & -C^T Q_R & 0 \\ -Q_R C & Q_R & 0 \\ 0 & 0 & R_{\Delta u} \end{pmatrix}, \quad S = \begin{pmatrix} C^T Q_R D \\ -Q_R D \\ -R_{\Delta u} \end{pmatrix},$$

$$R = D^T Q_R D + R_{\Delta u}.$$

LQID Experiment Design

Mixing together relaxed LQ constraint (5) and input signal optimality criterion (3) gives LQID $$\min_u (u - u_p)^T V(-\Sigma) V^T (u - u_p) \text{ s.t. } u^T H_2 u + f_2^T u + c_2 \leq 0.$$

This is quadratic programming problem with quadratic constraints (QPQC)

$$\min_u u^T H_1 u = f_1^T u \text{ s.t. } u^T H_2 u + f_2^T u + c_2 \leq 0,$$

where $H_1$ is negative definite, therefore optimal solution will always be on the boundaries, i.e. equivalent solution can be obtained with equality constraints $$\min_u u^T H_1 u + f_1^T u \text{ s.t. } u^T H_2 u + f_2^T u + c_2 = 0.$$

This non-convex optimization problem can be easily solved (Section 4).

EXAMPLE 2

LQID is applied to system $$G(s) = \frac{\omega^2}{s + 2\omega\xi s + \omega}, \quad \omega = 0.2\pi, \quad \xi = 1.$$

Figure 3:
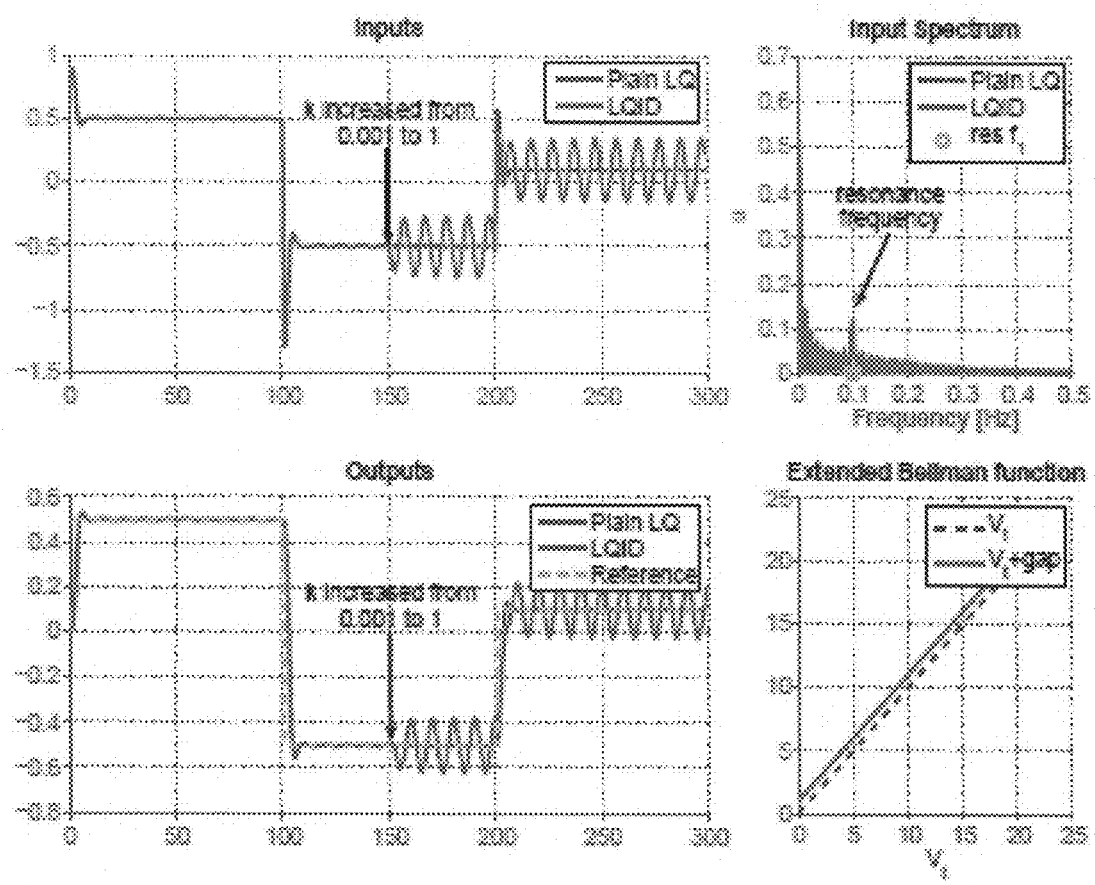
FIG. 3 illustrates a first example of LQID with fixed selected models.
Figure 4:
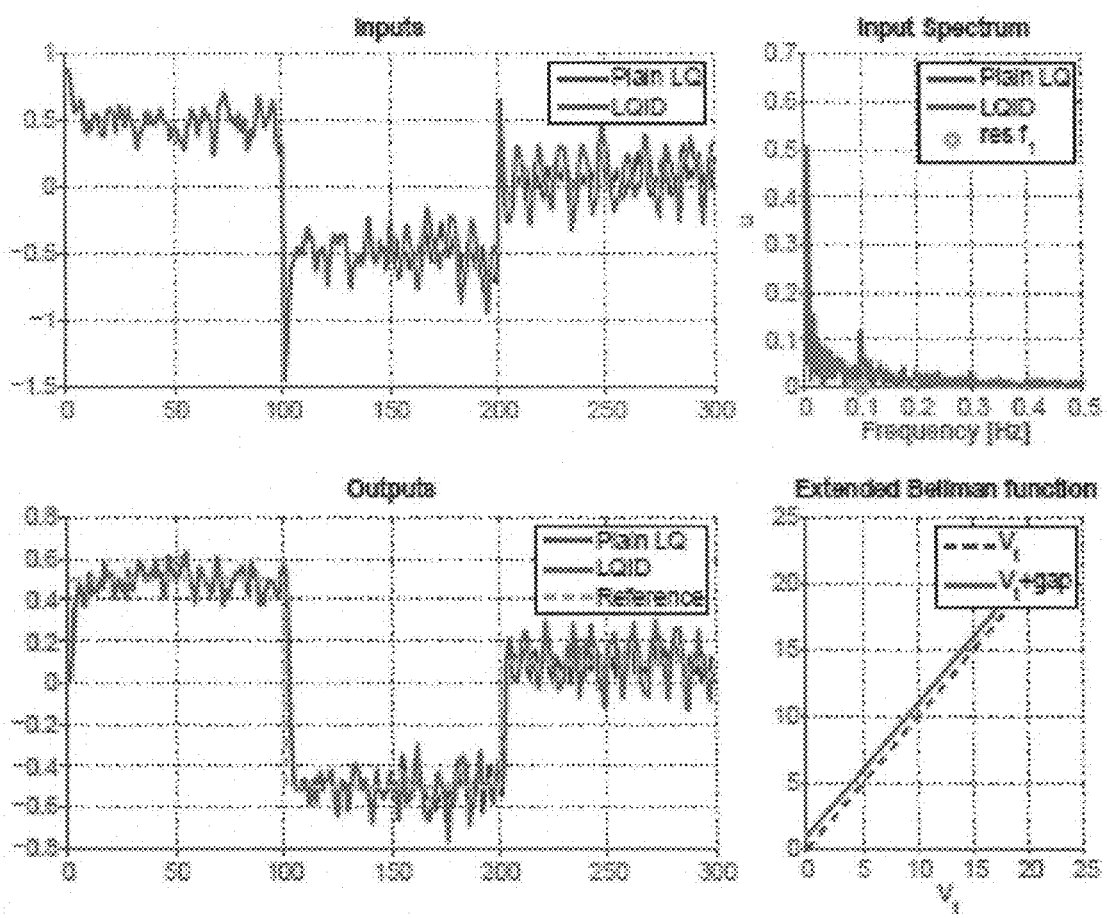
FIG. 4 illustrates another example of LQID with fixed selected models and strong additive measurement noise.

Two models, which need to be distinguished, are fixed to same model with parameters
sys1: $\omega_1$=0.2π, $\xi_1$=1,
sys2: $\omega_2$=0.2π, $\xi_2$=0.05.
Their frequency characteristics are similar except the resonance frequency area→ the input signal causing highest difference on systems outputs is harmonic signal with frequency w=2π. The parameters of LQID are
$Q_r$=10, $R_{\Delta u}$=10, h=30, $T_s$=1.
The input design with negligible additive measurement noise ($\sigma_e$=0.001) is in FIG. 3. The input design with significant noise ($\sigma_e$=0.1) is in FIG. 4.
Notice that after k is increased from 0.001 to 0.1 in t=150 the reference is tracked and the disturbances are rejected with the input preferring 0.1 Hz harmonic, which is the most differentiating input signal.

EXAMPLE 3

Figure 5:
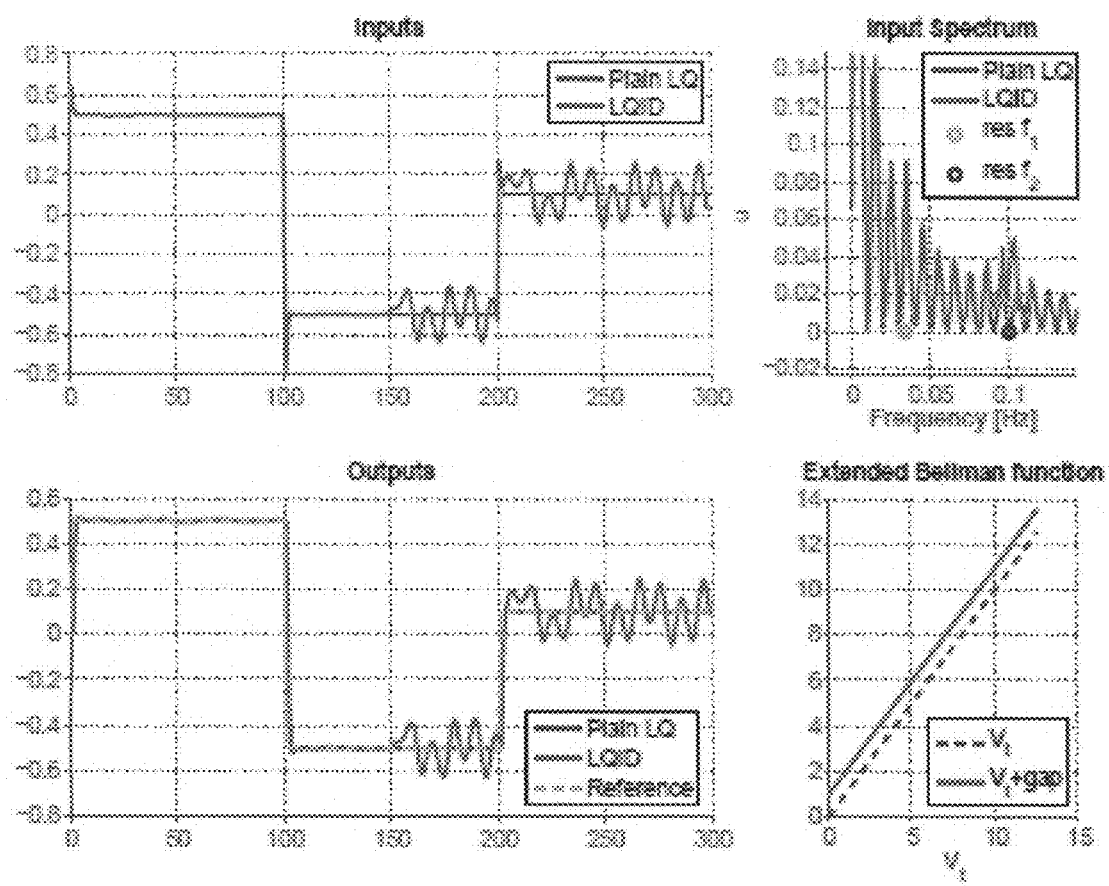
FIG. 5 illustrates yet another example of LQID with fixed selected models.

Similar example as the previous with 4th order system and two resonance frequencies 0.1 Hz and 0.3 Hz. LQID input design is in FIG. 5. Notice that additional signal to LQ optimal is harmonic with these two frequency components.
The LQID system is able to perform well even with unstable and non-minimum phase systems Identification with LQID In the preceding description, it was assumed that there are two models and it is uncertain, which is correct or closer to the real system. The input was designed to optimally distinguish between these two systems, while also respecting control criterion. However, the real system model was assumed as known. In the ensuing description the LQID will be used with recursive identification to design input signal, which would most efficiently identify the system, i.e. reducing maximal eigenvalue of parameters covariance on finite interval with limited energy of LQ optimal trajectory perturbation.

Process 1 (Identification with LQID)
1. Pre-identification—short non-optimal identification to acquire rough model $M_0(0)$ or obtaining this preliminary model from historical process data.
2. Use $M_0(t)$ parameters uncertainty and select two models $W_1(t)$ and $M_2(t)$ which need to be distinguished by input signal.
3. Estimate current states $x_1(t)$, $x_2(t)$ of models $M_1(t)$, $M_2(t)$ by KF.
4. Find minimum difference signal $u_p$ and additional perturbations basis V with weights $\Sigma$ (Section 1.2)
5. Solve QPQC optimization (7) and apply first input $u(t)$ from computed optimal trajectory $u_t^{t+h-1}$.
6. Get new I/O pair and update model $M_0(t+1)$. Continue to 2.

EXAMPLE 4

System $$G(s) = \frac{3}{5s^2 + 16s + 3}$$

is sampled with $T_s=1$ s and its output is measured with additive white noise with standard deviation $\sigma_e=1$. The system is modeled as the second order ARX model $$y(t) = \frac{b_1 d + d_0 d^2}{1 + a_1 d + a_0 d^2} u(t) + e(t).$$

Figure 6:
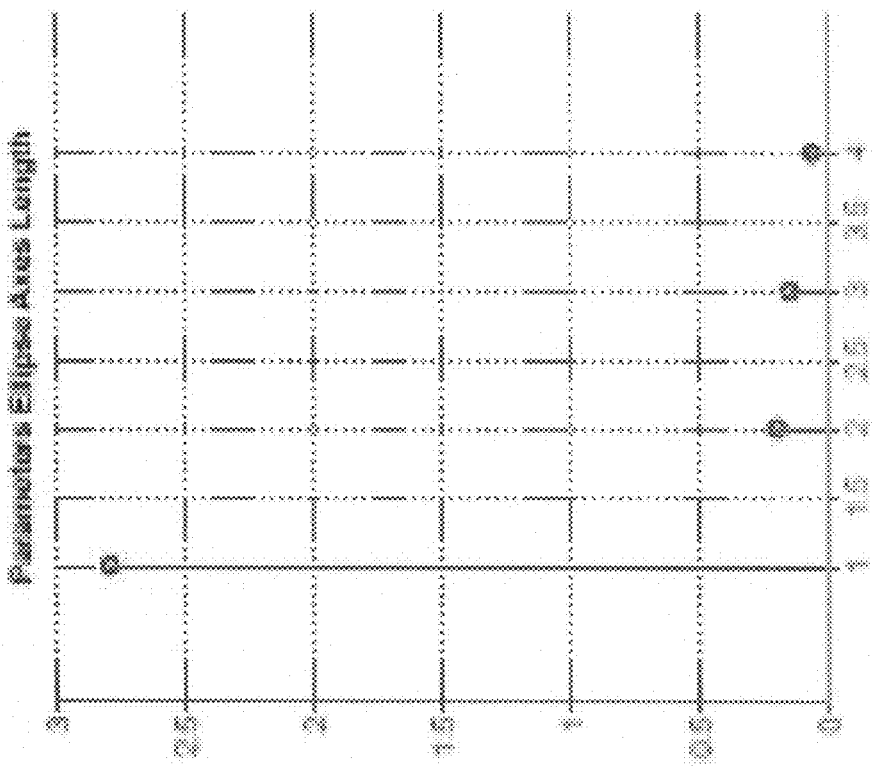
FIG. 6 illustrates pre-identification for LQID.
Figure 6:
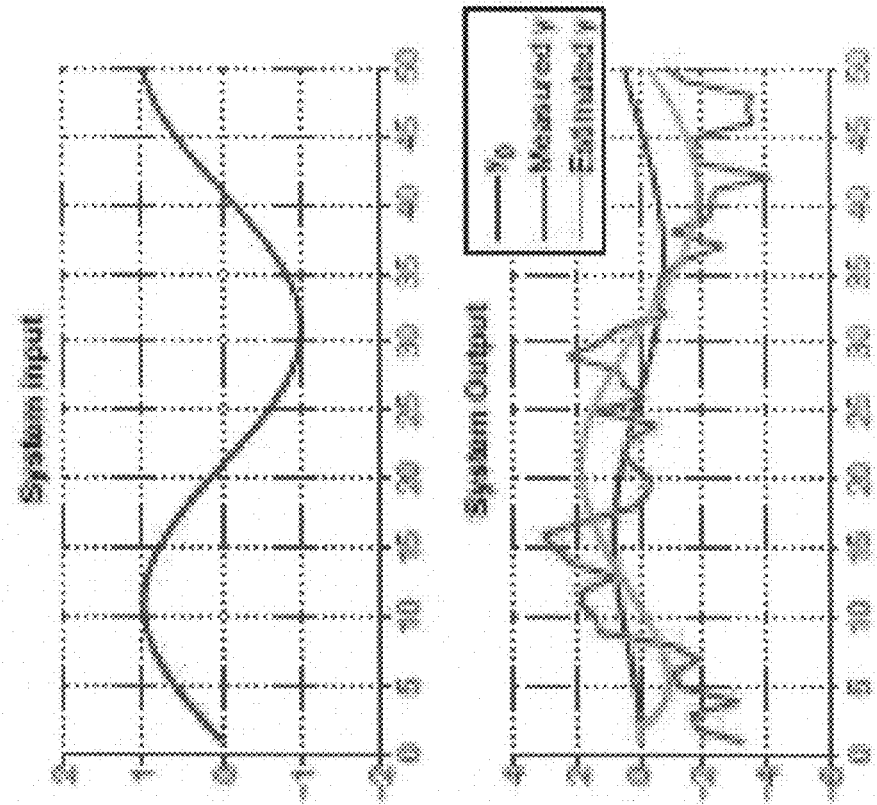
Figure 7:
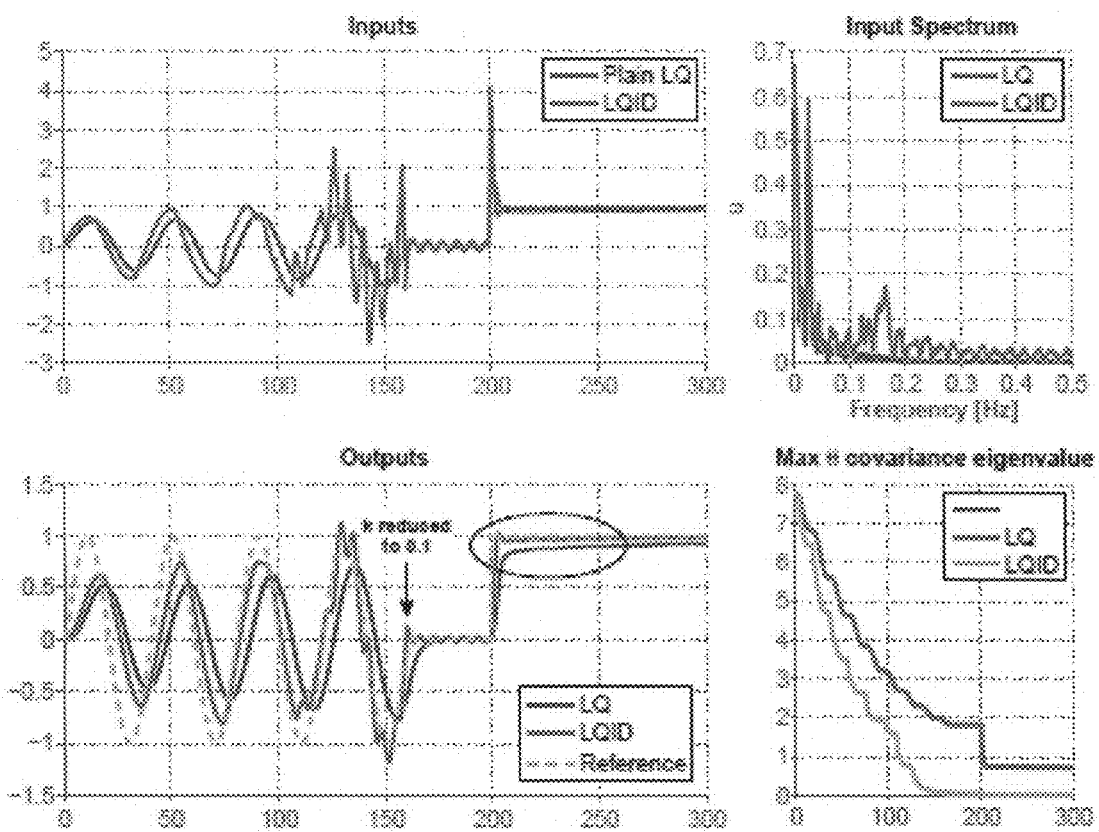
FIG. 7 illustrates LQID identification compared to LQ.

In the pre-identification phase the system is insufficiently excited (on purpose) by one and quarter period of harmonic signal with frequency 0.025 Hz and noise $e(t)\sim N(0, 1)$ (FIG. 6). Obtained model is used as an initial model for LQID (FIG. 7). A reference signal is in the beginning the same with the pre-identification input, i.e. control action of LQ controller brings minimum new information into parameters estimate. The coefficient k of LQID is 100× reduced at time t=160. Notice the difference between LQ and LQID tracking of step in t=200 (black ellipse). Also notice rapid decrease of maximal covariance eigenvalue of LQID vs. LQ (bottom right figure).

QP with Quadratic Constraints

Quadratic programming with quadratic constraints (QPQC)

$$\min_x x^T H_1 x + f_1^T x \text{ s.t. } x^T H_2 x + f_2^T x + c_2 = 0, \quad H_2 > 0,$$

is optimization problem on the surface of hyper-ellipsoid. This problem is apparently non-convex in the primary formulation. However, it can be reformulated to convex problem even for criterion with arbitrary Hessian.

Normalization of QC

To simplify QPQC the optimization on the surface of general ellipsoid is transformed to optimization on the surface of unit sphere. This can be done by transforming constraints to "centralized" form $$(x-x^*)^T H_2 (x-x^*) + d_2 = 0,$$

where $$x^* = -\frac{1}{2}H_2^{-1}f_2, \quad d_2 = c_2 + \frac{1}{2}f_2^T x^*.$$

Decomposing $H_2$ by eigen-decomposition to $VDV^T = VD^{1/2}D^{1/2}V^T$ and dividing by $-d_2$ $$(x-x^*)^T VD^{1/2}(-d_2)^{1/2}(-d_2)^{-1/2}D^{1/2}V^T(x-x^*)-1=0.$$

Introducing substitution $\bar{x}=(-d_2)^{-1/2}D^{1/2}V^T(x-x^*)$ transforms constraints on the surface of the unit sphere $$\bar{x}^T\bar{x}=1.$$

Transformed optimization problem is $$\boxed{\min_{\bar{x}} \bar{x}^T H \bar{x} + f^T \bar{x} \text{ s.t. } \|x\| = 1,}$$

where $$H=-d_2 D^{-1/2} V^T H_1 V D^{-1/2},$$

$$f=\sqrt{-d_2}(2x^{*T}H_1 V D^{-1/2}+f_1^T V D^{-1/2}).$$

Notice that feasible set is empty if $d_2>0$.

QP on the Surface of Unit Sphere

The optimization $$\min_{\bar{x}} \bar{x}^T H \bar{x} + f^T \bar{x} \text{ s.t. } \|x\| = 1,$$

is solved by transformation to an equivalent convex problem. These transformations are done such that the position of the minimum on the feasible set is not changed:
1. multiplication by a positive constant
2. adding of function with constant value on the feasibility set, for example $x^T x$, which is equal to 1 on the constraints The solution is divided for two cases:
positive definite H
non-positive definite H Positive Definite H Quadratic criterion function is extended with term $\alpha\alpha^T x$ $$f(\bar{x},\alpha)=\bar{x}^T(H+\alpha I)\bar{x}+f^T\bar{x}.$$

Figure 8:
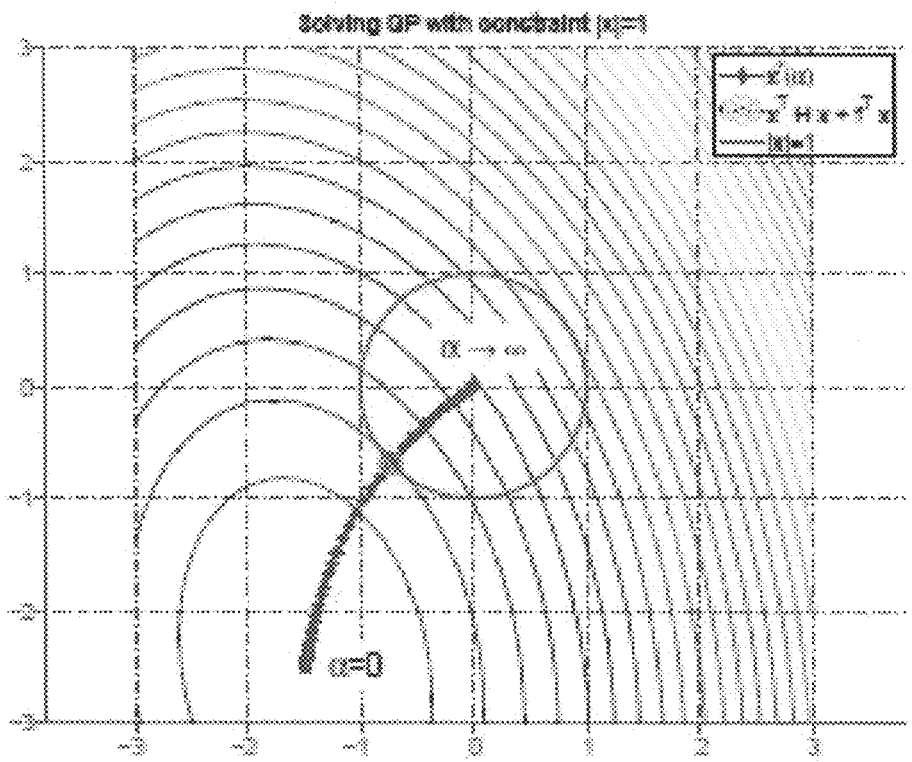
FIG. 8 illustrates a fist example of positive definite Hessian.

Varying $\alpha$ in the range $(-\min(\text{eig}(H)), \infty)$ preserves the positive definiteness of $H+\alpha I$ and changes the position of unconstrained minimum $$x^*(\alpha) = -\frac{1}{2}(H+\alpha I)^{-1}f$$

from infinity to origin. Finding $\alpha^*$ such that $\|x^*(\alpha^*)\|=1$ gives also the optimal solution of the original non-covex problem as $x^*(\alpha^*)$. This solution satisfies the constraints and additional term does not change the position of minimum on the feasibility set (FIG. 8).

Solving $\|x^*(\alpha^*)\|=1$ is straightforward, because $\|x^*(\alpha)\|$ is a monotonous function on the range $\alpha\in(-\min(\text{eig}(H)), \infty)$ with function value from $\infty$ to 0 respectively (can be shown by second derivative). However, numerical problems may occur in direct application of Newton method and it may be safer to use for example interval halving (finite interval may be obtained by substitution $$\alpha(t) = \frac{-t}{t-1} + \alpha_{min}).$$

Non-Positive Definite H

The solution for non-positive definite H is similar to the previous. This time the original criterion function is multiplied by $\alpha>0$ and term $x^T x$ is added $$f(\bar{x},\alpha)=\alpha(\bar{x}^T H\bar{x}+f^T\bar{x})+x^T x.$$

Figure 9:
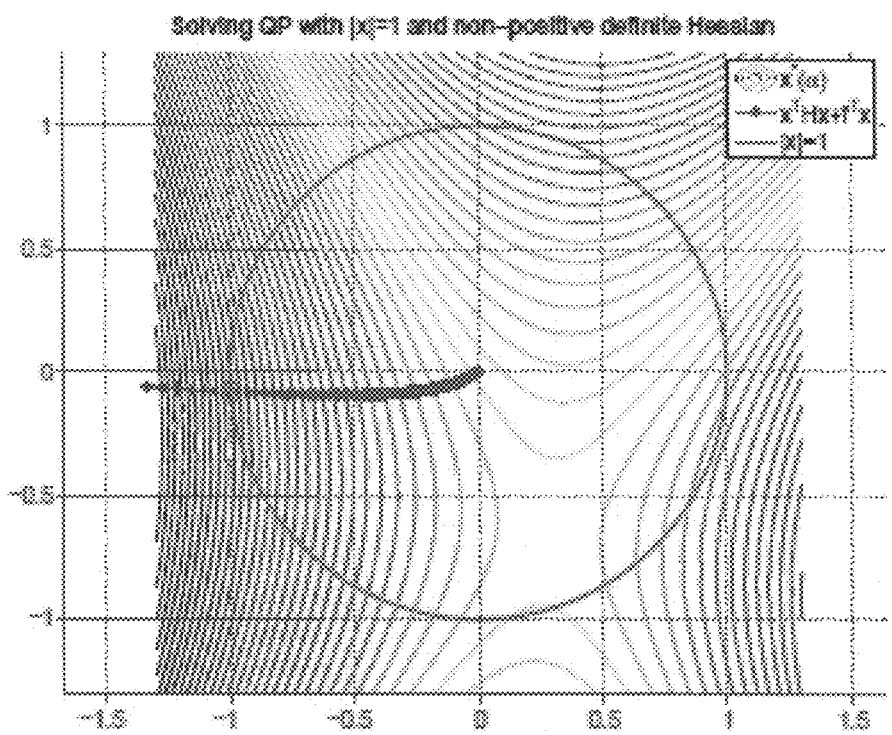
FIG. 9 illustrates a second example of non-positive definite Hessian.

Varying $\alpha$ in the range $(0.1/\min(\text{eig}(H)))$ assures positive definiteness of $f(\bar{x}, \alpha)$ and changes the position of unconstrained minimum $$x^*(\alpha) = -\frac{1}{2}(\alpha H + I)^{-1}\alpha f$$

from infinity to origin (FIG. 9).

EXAMPLE 5

Figure 10:
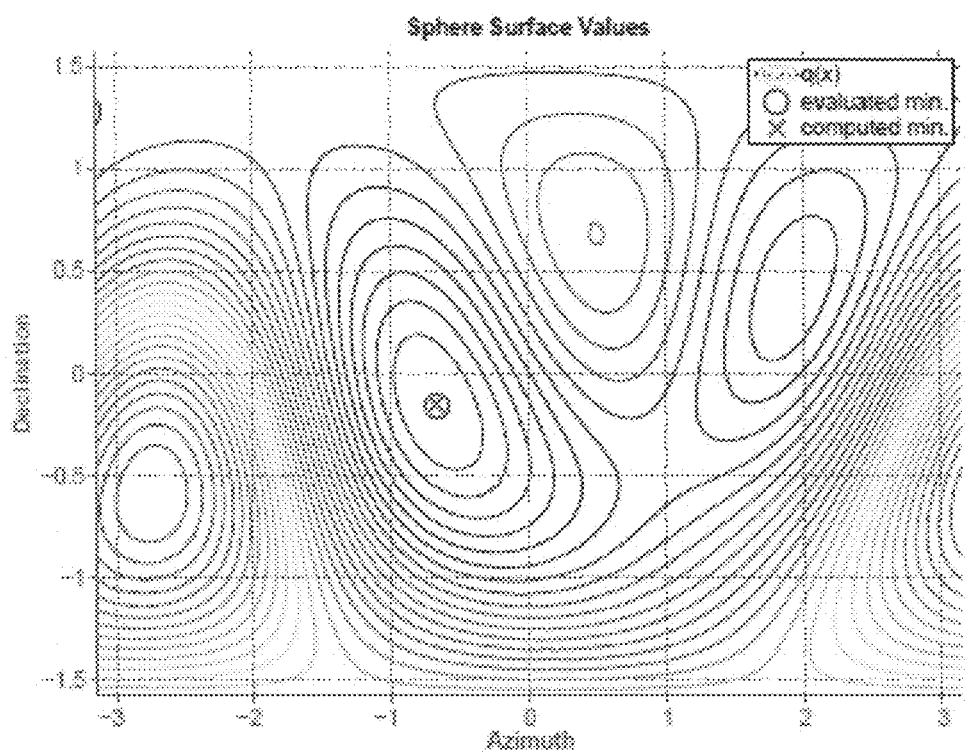
FIG. 10 illustrates 2D projection of the function values on the surface of 3D unit sphere.

A more complex example with indefinite H $$H = \begin{pmatrix} 2.944 & 1.601 & 1.735 \\ 1.601 & 1.103 & 0.323 \\ 1.736 & 0.323 & 2.679 \end{pmatrix}, \quad f = \begin{pmatrix} -2.415 \\ -0.694 \\ -1.391 \end{pmatrix}$$

is in FIG. 10.

EXAMPLE 6

Figure 11:
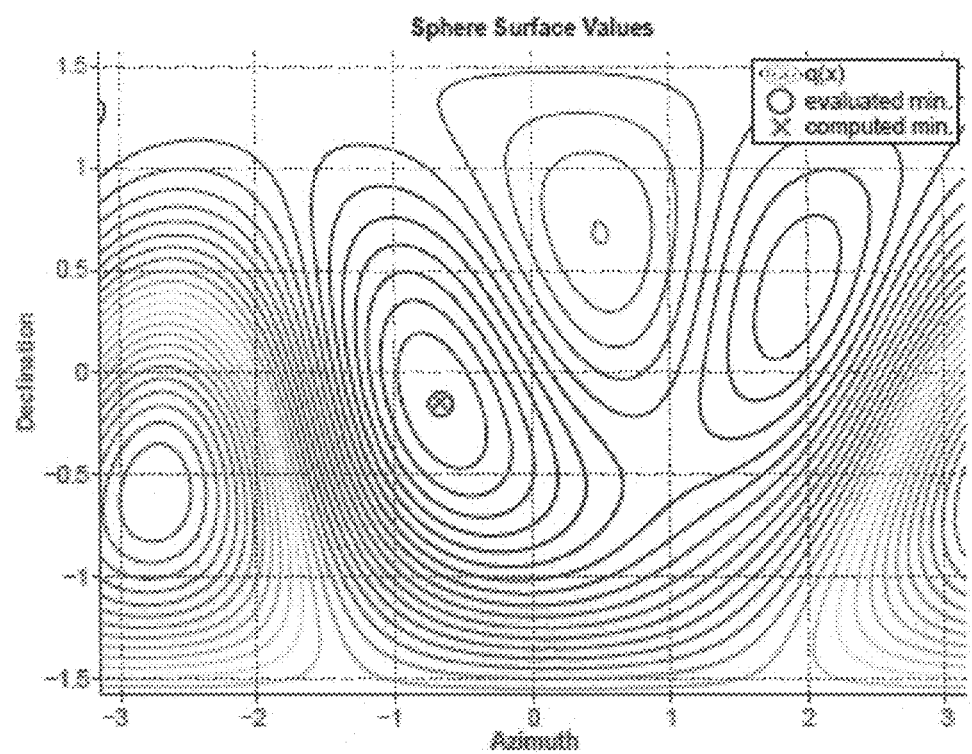
FIG. 11 illustrates quadratic programming with indefinite Hessian and quadratic constraints.

And an example of QPQC $$\min_x x^T H_1 x + f_1^T x \text{ s.t. } x^T H_2 x + f_2^T x + c_2 = 0, \quad H_2 > 0,$$

with $$H_1 = \begin{pmatrix} -2 & .5 \\ .5 & 1 \end{pmatrix}, \quad f_1\begin{pmatrix} 2 \\ -5 \end{pmatrix},$$

$$H_2 = \begin{pmatrix} 1 & -.4 \\ -.4 & .5 \end{pmatrix}, \quad f_2 = \begin{pmatrix} 2.4 \\ .4 \end{pmatrix}, \quad c_2 = 1.8$$

is in FIG. 11.

In one embodiment, the system and process avoids mixing control and identification criterion into single criterion on purpose, because there is no reasonable way to make it correctly. It would involve mixing of negative and positive definite quadratic functions and the solution would abruptly change at point of mixture Hessian eigenvalue crossing zero.

Instead control criteria are formulated as relaxed constraints. On the other hand the LQID formulation still "mixes" the criterions as the cheaper directions from LQ criterion are wider than more expensive directions in quadratic constraints.

Application of the same approach to MPC would require negative and positive definite criterions mixing. There is no reasonable solver for indefinite QP with linear constraints.

Box constraints on the inputs can be approximately implemented by inspection and modification of quadratic constraints hyper ellipse to fit box constraints.

Simple modification can be used to emphasize identification on low frequencies by adding low-pass filter to finding minimum difference input signal and basis by changing (2) into $$\Delta y(u)=H_{LP}(y_1-y_2)$$

where $H_{LP}$ is Toeplitz matrix of low-pass filter impulse responses. This allows to design input signal for identification on low frequencies only.

Figure 12:
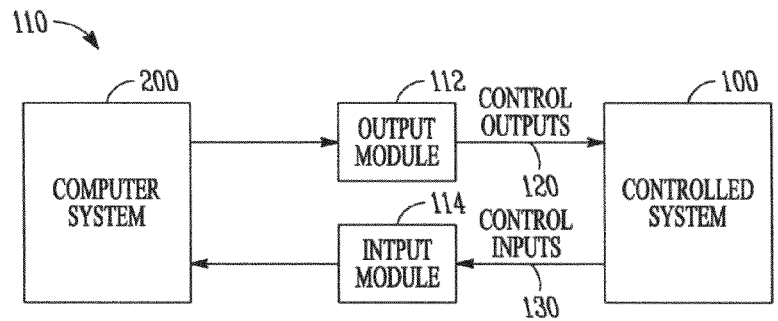
FIG. 12 illustrates an example control system environment.

Referring now to FIG. 12, there is illustrated a simplified block diagram of a controlled system 100 under the control of a control system 110. Control system 110 includes a computer system 200, an output module 112, and an input module 114. In operation, control system 110 generates system control outputs 120 from module 112 and receives system control inputs 130 from input module 114. Control inputs and outputs 120 and 130 may take the form of analog or digital control signals received from controlled system 100.

Figure 13:
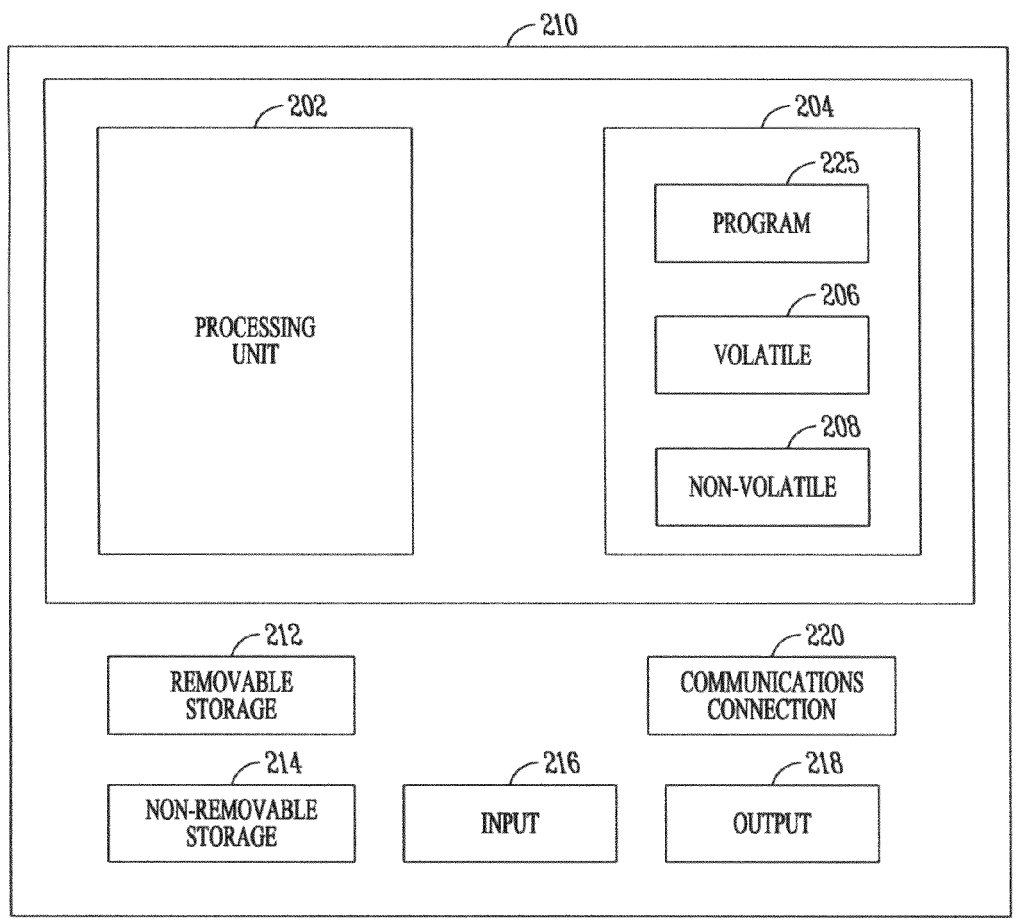
FIG. 13 illustrates an example computer system useful in a control system.

Referring now to FIG. 13, there is illustrated a block diagram of a computer system 200 that executes programming for implementing the above-described process control or system identification algorithms. A general computing device in the form of a computer 210, may include a processing unit 202, memory 204, removable storage 212, and non-removable storage 214. Memory 204 may include volatile memory 206 and non-volatile memory 208. Computer 210 may include—or have access to a computing environment that includes—a variety of computer-readable media, such as volatile memory 206 and non-volatile memory 208, removable storage 212 and non-removable storage 214. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other tangible and physical medium capable of storing computer-readable instructions. Computer 210 may include or have access to a computing environment that includes input 216, output 218, and a communication connection 220. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 202 of the computer 210. A hard drive, CD-ROM, and RAM are some examples of articles including a computer-readable medium.

The Abstract is provided to comply with 37 C.F.R. §1.72(b) is submitted with the understanding that it will not be used to interpret or limit the scope or meaning of the claims.

The invention claimed is:

1. A method for system model identification by performing experiments on a system to be controlled, comprising:
   selecting at least two system models such that discriminating between the two models enables improvement in model quality, wherein for a given input to the system the models produce different outputs;

determining an input having a control component and an identification component, the control component for control of the system and the identification component for identification experiments;

wherein the system identification experiments are based on modification of linear quadratic control to perform system identification in closed loop; and further wherein the control component and identification component of the input is determined simultaneously.

2. A method according to claim 1 wherein the input is limited in energy and adapted to substantially maximize the difference on the outputs of the selected models so as to distinguish between them.

3. A method according to claim 1 wherein a quadratic norm of the input signal is limited.

4. A method according to claim 1, wherein control is based on a Linear Quadratic (LQ) control, which is relaxed to allow limited deviation from LQ optimal trajectory, and wherein this deviation is used to inject additional signal optimized for identification.

5. A method according to claim 1 wherein the system has a single parameter adjusting the energy of additional signal used to explore the system.

6. A method according to claim 5, wherein the single parameter allows conducting the identification experiment, where open-loop operation is not possible due to the limits on maximum disruption, and the energy of additional signal is set to meet the maximum allowable disruption requirements.

7. A method according to claim 1 wherein control is based on a non-convex quadratic programming with quadratic constraints (QPQC).

8. A method for system model identification by performing experiments on a system to be controlled, comprising:

performing identification experiments in a closed loop, wherein an existing control strategy is used as a starting model;

modifying the existing control strategy to inject additional signal optimized for identification;

wherein the experimenting is performed with system manipulations which explore system model uncertainties important to potential degradation of controller performance by discrepancy between the system and the system model; and further wherein the identification experiments are performed with an input that includes a system control component and an identification component that are determined simultaneously.

9. A method according to claim 8 wherein the system has a single parameter adjusting the energy of additional signal used to explore the system.

10. A method according to claim 9, wherein the single parameter allows conducting the identification experiment, where open-loop operation is not possible due to the limits on maximum disruption, and the energy of additional signal is set to meet the maximum allowable disruption requirements.

11. A method according to claim 8 wherein control is based on a Linear Quadratic (LQ) control, which is relaxed to allow limited deviation from LQ optimal trajectory, and wherein this deviation is used to inject additional signal optimized for identification.

12. A method according to claim 8 wherein control is based on a non-convex quadratic programming with quadratic constraints (QPQC).

13. A method according to claim 8 herein the input is limited in energy and adapted to substantially maximize the difference on the outputs of the selected models so as to distinguish between them.

14. Apparatus comprising:

a control system to control a respective system or process, wherein the control system uses advanced process control using a system model;

the control system having a system model that is determined using system model identification that is performed with experiments on a system to be controlled wherein:

a) identification experiments are performed in a closed loop, wherein an existing control strategy is used as a starting model;

b) the existing control strategy is modified to inject additional signal optimized for identification;

c) the experimenting is performed with system manipulations which explore system model uncertainties important to potential degradation of controller performance by discrepancy between the system and the system model; and d) further wherein the identification experiments are performed with an input that includes a system control component and an identification component that are determined simultaneously.

15. Apparatus according to claim 14 further wherein the control system is based on model predictive control.

16. Apparatus according to claim 14 further wherein the control system includes a computer system, one or more sensors, and an output system to provide control inputs to the respective system to be controlled.

17. Apparatus according to claim 14 further wherein a single parameter allows conducting the identification experiment, where open-loop operation is not possible due to the limits on maximum disruption, and the energy of additional signal can be set to meet the maximum allowable disruption requirements.

18. Apparatus according to claim 14 wherein the system control is based on a Linear Quadratic (LQ) control, which is relaxed to allow limited deviation from LQ optimal trajectory, and wherein this deviation is used to inject additional signal optimized for identification.

19. Apparatus according to claim 14 wherein the system control is based on a non-convex quadratic programming with quadratic constraints (QPQC).

20. A method according to claim 19 wherein the input is limited in energy and adapted to substantially maximize the difference on the outputs of the selected models so as to distinguish between them.

* * * * *